H. W. PIERCE.
PISTON.
APPLICATION FILED SEPT. 11, 1920.
1,383,849.
Patented July 5, 1921.
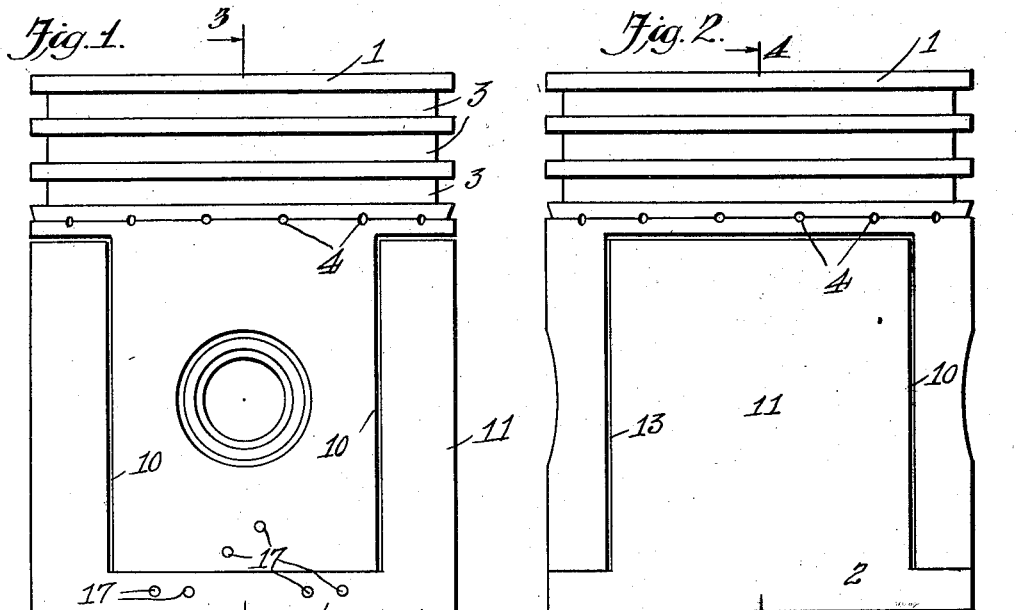
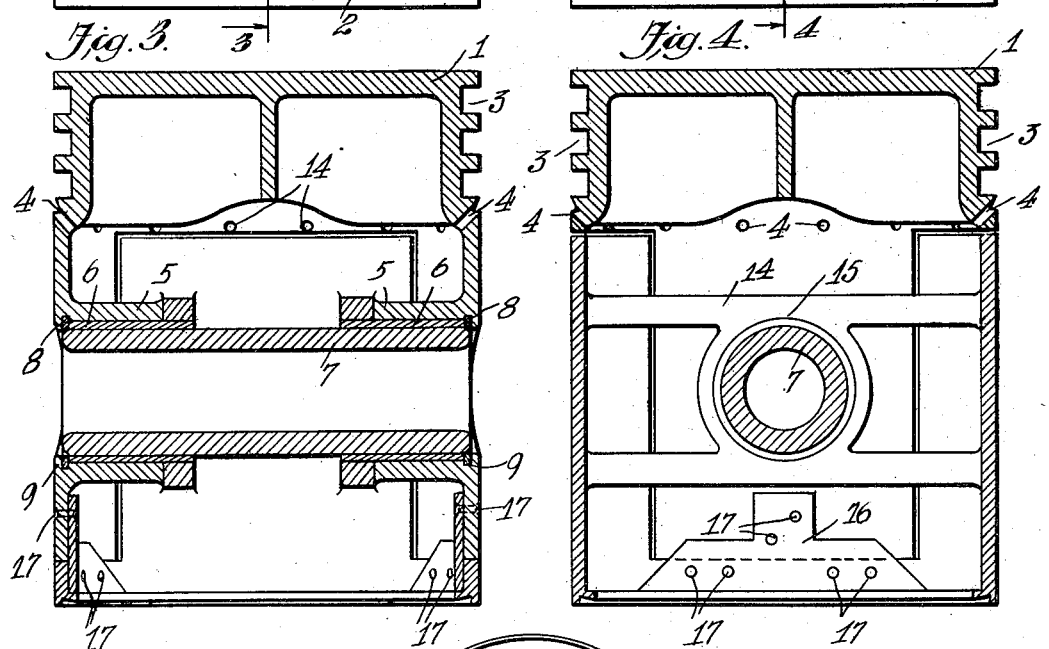
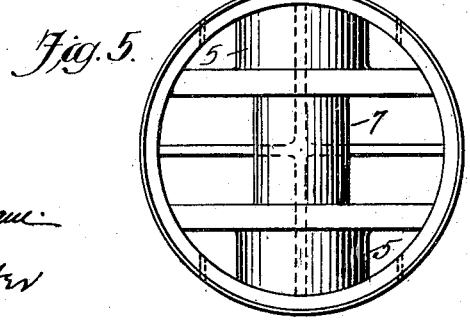
WITNESSES
Frank J. Faggiani
S. W. Foster
INVENTOR
H. W. PIERCE
BY
ATTORNEYS

UNITED STATES PATENT OFFICE.

HOWARD W. PIERCE, OF BUTTE, MONTANA.

PISTON.

1,383,849.   Specification of Letters Patent.   Patented July 5, 1921.

Application filed September 11, 1920. Serial No. 409,615.

*To all whom it may concern:*

Be it known that I, HOWARD W. PIERCE, a citizen of the United States, and a resident of Butte, in the county of Silver Bow and State of Montana, have invented a new and Improved Piston, of which the following is a full, clear, and exact description.

This invention relates to improvements in pistons, and more particularly to pistons for internal combustion engines, an object of the invention being to provide a piston which is constructed mainly of aluminum, but which is reinforced by a section of cast iron, which cast iron section operates to take the load caused by the angularity of the connecting rod and its surfaces due to the thrust of the connecting rod, and hence relieve the aluminum portions of the piston and insure an accurately fitting piston of long life yet mainly of aluminum.

It is common in the art to construct pistons of aluminum, but these pistons, due to the angularity of thrust, soon wear and become untrue so that there is an irregularity of movement causing what is known as "slaps," and it is the purpose of my invention to construct a composite piston composed mainly of aluminum, but partly of cast iron, which will provide a light, yet durable piston, and which will be so constructed as to compensate for the differences in expansion and contraction of the metals employed.

With these and other objects in view the invention consists in certain novel features of construction, and combinations and arrangements of parts, as will be more fully hereinafter described and pointed out in the claims.

In the accompanying drawings—

Figure 1 is a view in side elevation illustrating my improved piston.

Fig. 2 is a view in side elevation taken at right angles to Fig. 1.

Fig. 3 is a view in longitudinal section on the line 3—3 of Fig. 1.

Fig. 4 is a view in longitudinal section on the line 4—4 of Fig. 2.

Fig. 5 is an end view of the piston.

My improved piston comprises upper and lower sections 1 and 2, both of general cylindrical form. The upper section 1 is composed preferably of aluminum and is provided with piston ring receiving grooves 3 and with lubricant ports 4 to allow the lubricant from the interior of the piston to escape to the outer surface thereof below the piston. The lower section 2 is composed preferably of cast iron or other similar cast metal.

The piston section 1 constitutes the head or upper end of the piston and is provided in its lower portion with inwardly projecting bosses 5 receiving bearing sleeves 6 in which a piston pin 7 is mounted. Split clamping rings 8 are sprung into grooves 9 in the walls of the piston at the ends of the pin 7 to secure the pin in the piston.

The lower portion of the piston section 1 is provided in opposite sides with upwardly extending recesses 10 into which upwardly projecting side members 11 of the lower section 2 project. These side members 11, 11, form integral parts of the cast metal section 2 and conform in general curvature with the curvature of the piston, and between the edges of said side members 11 and the walls of the recesses 10 an ample clearance is provided as shown at 13, to compensate for the varying expansion and contraction of the aluminum and the cast iron.

Integral transversely projecting bridges 14 connect the side members 11, 11, and have rings 15 at their center receiving the bearing sleeves 6 and the pin 7 so as to sustain the thrust of the pin and convey said thrust to the side members 11, 11, relieving the aluminum section 1 of the piston from said thrust. These bridges 14, therefore, serve as a connecting medium between the two sections 1 and 2 of the piston and to further secure the sections together I provide coupling plates 16 which are riveted to the lower section 2 and to the side portions of the upper section 1 as shown at 17. These coupling plates 16 may be of any desired size and shape and in any desired number.

In operation the piston will fit the ordinary cylindrical internal combustion engine and the cast metal section 2 will take the temperature of the cylinder requiring but very little clearance, while any differences in expansion and contraction of the aluminum section 1 will be permitted by the clearance between the sections 1 and 2, and the piston will be maintained tight in the cylinder and result in a piston of long life yet relatively light.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A piston of the character described composed of aluminum and iron sections, the aluminum sections having alined openings in the walls thereof, a pin located in the piston and in alinement with said openings, and a bridge fixed to the iron section and supporting an intermediate portion of the pin, whereby the side or connecting rod thrust of the piston is sustained by said iron section.

2. A piston of the character described composed of aluminum and cast iron sections, a piston pin supported in the aluminum portion of the piston, side members on the cast iron sections located at the sides of the piston at right angles to the disposition of the pin whereby the side or connecting rod thrust of the piston is sustained by said cast iron section, and bridges connecting the side members of the cast iron section and receiving and supporting the pin.

3. A piston of the character described, comprising an upper aluminum section having internal pin receiving bosses, a pin in said bosses, said aluminum section having recesses in its opposite sides at right angles to the disposition of the pin, a cast metal lower piston section, integral side members on the cast metal section located within the recesses of the aluminum section, and said side members and the walls of said recesses spaced apart providing clearance between them.

4. A piston of the character described, comprising an aluminum section having internal pin receiving bosses, a pin in said bosses, said aluminum section having recesses in its opposite sides at right angles to the disposition of the pin, a cast metal lower piston section, integral side members on the cast metal section located within the recesses of the aluminum section, integral bridges connecting the cast metal side sections, and rings on the bridges receiving the pin.

5. A piston of the character described, comprising upper and lower sections, integral inwardly projecting bosses on the upper section, bearing sleeves in said bosses, a piston pin in said bearing sleeves, clamping rings at the end of the pin, said upper section having recesses in its sides at right angles to the disposition of the pin, integral side members on the cast metal section located in said recesses, bridges integral with the side members, and rings on said bridges receiving the bearing sleeves and the pin.

HOWARD W. PIERCE.